May 5, 1936. J. GASKELL ET AL 2,039,402
APPARATUS FOR CUTTING FLAT GLASS
Filed Dec. 23, 1933 2 Sheets-Sheet 1
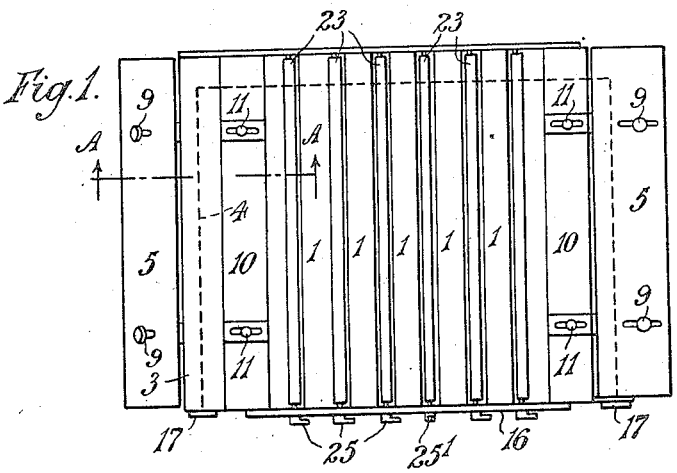
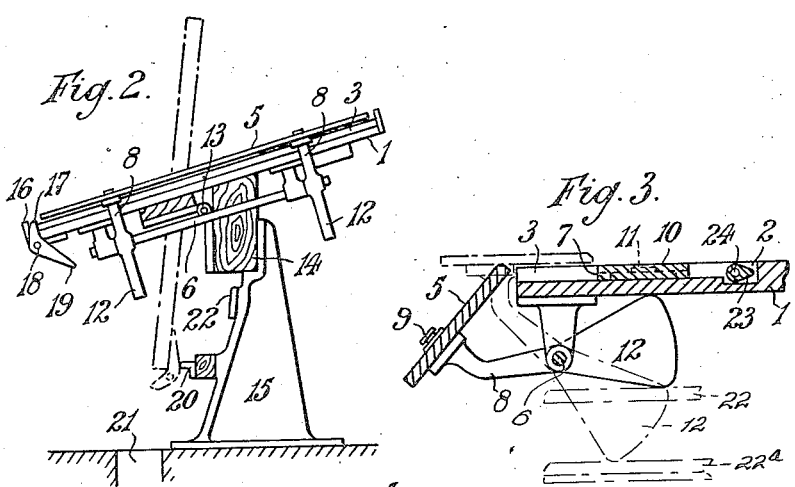
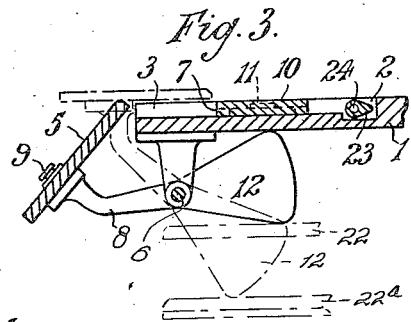
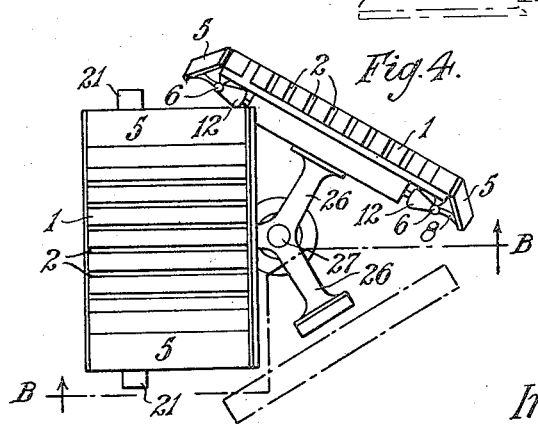
Inventors.
Joseph Gaskell & James B. Watt
BY Morrison, Kennedy & Campbell
Attorneys.

Patented May 5, 1936

2,039,402

UNITED STATES PATENT OFFICE 2,039,402

APPARATUS FOR CUTTING FLAT GLASS

Joseph Gaskell and James Bonar Watt, St. Helens, England, assignors to Pilkington Brothers Limited, Liverpool, England Application December 23, 1933, Serial No. 703,685
In Great Britain January 3, 1933

7 Claims. (Cl. 33—76)

This invention relates to apparatus for cutting flat glass of which the edges have to be trimmed and has for its object an improved apparatus whereby the work of cutting and discarding defective glass is facilitated.

The apparatus is particularly applicable to flat drawn sheet glass in which a small width at each edge is defective and has to be cut off and discarded.

According to one form of the invention a table for cutting and trimming the edges of flat glass is pivotally mounted so that it can occupy either a nearly horizontal or a nearly vertical position. When in a nearly horizontal position it is conveniently placed for cutting, and is provided with means, such as a ledge along its lower edge, for retaining the main portion of the glass when it is in its nearly vertical position, while the cut-off edge portions are then free to slide off the table into a cullet chute.

Preferably, retaining pieces at the lower edge of the table, below the cut off edge portions, retain these portions during the first part of the tilting movement, and are automatically withdrawn by the continued tilting movement, when the table is in a position to guide the edge portions into the cullet chute.

The table is preferably provided with guides for scoring the glass for edge trimming, the guides being so attached to the table, as for instance, by hinging, that they can be removed from its surface for laying on the glass and replaced over the glass in predetermined position. These movements of the guides may be performed automatically.

The end portions of the table, from the lines of score for edge trimming, are preferably depressed below the surface of the table to permit the edge portions to be snapped off.

In order that the main portion of the glass may be cut, the table is preferably provided with a plurality of channels, each containing means, such as an eccentrically pivoted lath, by which the glass may be raised from the table close to a score and snapped.

When the glass sheets to be cut are lengths cut off flat drawn strip as this is formed, the sheets are hot and are not easily cut. The invention therefore includes an apparatus consisting of a plurality of tables on which the glass can remain to cool before it is cut.

In the accompanying drawings:—

Figure 1 is a plan view of the cutting table when in horizontal position;

Figure 2 is a side view thereof when in nearly horizontal position;

Figure 3 is a section of the cutting table on the line A—A of Figure 1 with an indication of relatively different positions of certain parts;

Figure 4 is a plan view of part of three cutting tables mounted for rotation about a vertical axis;

In all the drawings the same reference figures are used to designate similar parts.

Figure 5:
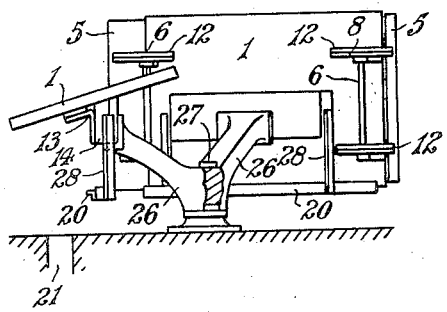
Figure 5 is a vertical section thereof on the line B—B of Figure 4.
Figure 6:
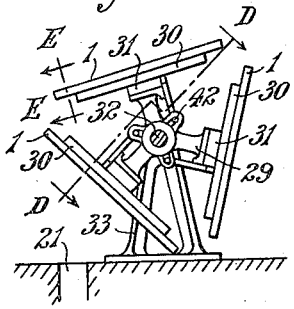
Figure 6 is a vertical section on the line C—C of Figure 7 of three cutting tables mounted on a horizontal axis.
Figure 7:
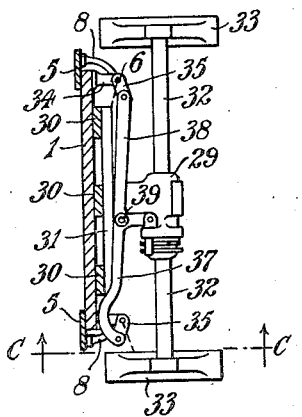
Figure 7 is a section thereof on the line D—D of Figure 6.

Referring to Figures 1, 2 and 3, which show one way of carrying out the invention, the table 1 is a flat board having a plurality of channels 2 and a depressed portion 3 at each end. The dotted lines 4 on Figure 1 indicate a sheet of glass laid on the table. The edge portion to be cut off is the portion overhanging the depressed portion 3.

At each end of the table, laths 5 are pivoted on the rods 6 by arms 8, the left-hand lath being shown turned back into the position which the two laths must occupy when the glass is laid on the table, while the right hand lath is shown turned so as to rest on the glass. When the two laths 5 rest on the glass, their inner edges form guides for scoring the glass immediately over the edges 7 above the depressed portions 3. When the glass has been scored along the edges of the laths 5, the edge portions are snapped off by pressing upon the laths 5, which are made flexible enough for this purpose.

The laths 5 are fixed to the arms 8 by screws 9 in slots in the laths, whereby they may be adjusted for cutting off the desired width of edge portion. Also the end portions of the table surface are formed by pieces 10 fixed to the table by screws 11 in slots whereby they may be adjusted so that their edges 7 are below the edges of the laths 5. The arms 8 have counterweights 12 which cause the laths to occupy their operative positions (as shown in dot-and-dash lines in Figure 3) when the table is in nearly a horizontal position.

The table 1 is hinged on a horizontal pivot at 13 to a beam 14 supported on a frame 15, so that it can occupy either the nearly horizontal position shown in full lines in Figure 2 or the nearly vertical position indicated in dotted lines in that figure. The upper portion of the beam 14 forms a rest for the table in its nearly horizontal position.

The lower edge of the table has a ledge 16, extending not quite up to the edges 7 and serving to retain the main portion of the glass when the table is tilted. The edge portions of the glass are retained during tilting to the nearly vertical position by arms 17 of levers pivoted to the table at 18. The other arms 19 of the levers are formed as counterweights normally to retain the levers in their operative position as shown in full lines in Figure 2, and are adapted to strike an abutment 20 fixed to the frame 15 when the nearly vertical position of the table is reached as shown in dotted lines in Figure 2. By so striking the abutment 20 the levers are turned so that their arms 17 no longer project beyond the surface of the table, and the edge portions of the glass are then free to slide off the table into the cullet chute 21.

The position of the table hinge 13 is such that the table rests by its own weight in the nearly horizontal position, which is a convenient position for cutting, and also in the nearly vertical position which is a convenient position for laying on and taking off the glass sheet. The words "nearly horizontal position" are intended to include any position in which the glass is conveniently placed for cutting. When the table is tilted into its nearly vertical position, the lower counterweights 12 which extend rearwardly from the pivot rod 6 as viewed in Figure 2, strike against a bar 22 fixed to the frame 15 and they, with the arms 8 and laths 5 are moved into the position shown in full lines in Figure 3, and then leave the table clear for removing the cut sheet and laying on another sheet.

The relative positions of the counterweight 12, the table 1 and the bar 22 at the beginning and end of the just mentioned movement of a lath 5 are indicated in Figure 3. The relative position of the bar marked 22 has reference to the lath 5, arm 8 and counterweight 12 as shown in full lines, while the position marked 22ª has reference to the said parts as shown in dot-and-dash lines. In each case the bar 22 and counterweight 12 are represented as viewed in a direction at right angles to the respective side of the counterweight. During the pivotal movement of the counterweight 12 its edge slides along the bar 22.

A lath 23 shaped as shown in Figure 3, lies in each channel 2 and is pivoted eccentrically on a shaft 24 to which a handle 25 is attached. The laths 23 are normally in the position shown in Figure 3, in which the upper surface of the table is left free. If it be desired to cut the main sheet of glass, the glass is scored and then the lath 23 nearest to the score is turned as shown by the handle 25', so as to raise the glass from the table and enable it to be snapped.

Referring to Figures 4 and 5, three tables 1 are mounted by hinges 13 and beams 14 on a three armed frame 26 adapted to turn on a vertical axis 27, so that any one of them can be brought into the operative position for receiving the hot sheets and later cutting and removing the cool sheets, which is the position at the left of the Figures 4 and 5. When a sheet of hot glass has been laid on the table which is in the operative position and occupying its nearly vertical position, the frame 26 is turned so as to bring the next table into operative position, and the glass previously laid on this, which has had time to cool, is then cut and removed. Another hot sheet is laid on this same table while it is still in the operative position and the third table is then brought into operative position, and so on.

The tables 1 are similar to the tables shown on Figures 1, 2 and 3, and details thereof are therefore omitted from Figures 4 and 5. The abutments 20 against which the levers 17, 19, strike are attached each to two depending angle irons 28 fixed to the ends of the beams 14, and these angle irons serve as the abutments against which the counterweights 12 strike.

By means of this apparatus, the glass can be cut when cool, without waste of time and with a small requirement of space, and the table in operative position may be conveniently placed relatively to the end of the apparatus at which the glass strip issues.

An alternative form of apparatus with three tables is shown in Figures 6 to 10 and has the advantages of the apparatus shown in Figures 4 and 5 with the additional advantage of occupying even less space.

Figure 8:
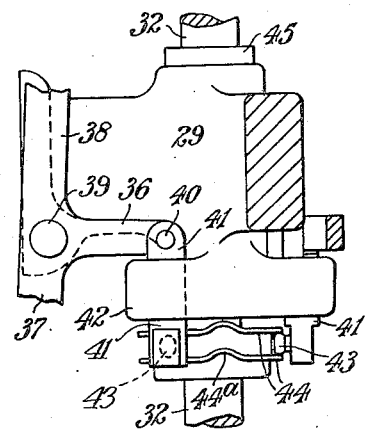
Figure 8 is a part view of Figure 7 on an enlarged scale.

Three tables 1 are mounted on a three-armed frame 29 by battens 30 and cross beams 31. The frame 29 is free to turn on a horizontal rod 32 held in two supports 33. The rotary motion of the frame 29 on the rod 32 serves to bring each table in turn into the nearly horizontal cutting position and into the nearly vertical position above the cullet chute 21. The tables are similar to the table shown in Figures 1, 2 and 3, except in the operation of the laths 5 and the levers 17, 19, and the operation of these parts will now be described. Other details which do not differ from those shown in Figures 1, 2 and 3 are omitted and certain details shown in the large scale drawings of Figures 8, 9 and 10 are omitted from the small scale drawings of Figures 6 and 7.

The arms 8 of the laths 5 (Figure 7) are attached to rods 6, adapted to turn in brackets 34, but are not provided with counterweights. An arm 35 is fixed to each rod 6 and the two arms 35 are pivoted to two arms 37, 38, respectively of a three-armed lever pivoted to an arm of the frame 29 at 39. The pivoting between the arms 35 and the arms 37, 38 is such as to provide for the arcual movement of the arms. The third arm 36 of the lever 37, 38 is pivoted at 40 to a plunger 41 (Figure 8) adapted to slide in a lug 42 of the frame 29 in a direction parallel to the rod 32. On the other end of the plunger 41 a roller 43 is mounted which engages in a cam 44 fast on the rod 32.

Each of the three tables has a similar construction of arms 35, 36, 37, 38, 39 and plunger 41 with roller 43, all engaging the one cam 44. The cam 44 retains the rollers in the position shown, corresponding to laths 5 being in operative position over the edges of the glass on the tables, during the whole rotation of each table except at one point where the cam surfaces, at 44ª, move the roller 43 and plunger 41 towards the centre of the frame 29, and cause the laths 5 to be moved clear of the table surface. This point corresponds to the nearly vertical position of each table over the chute 21. At all other positions of each table, therefore, the laths 5 serve to retain the glass sheet on the table while the table is facing downwards and serve as guides when the table is in operative position for cutting. The frame 29 is retained in position on the rod 32, in one direction by the cam 44 and in the other direction by the collar 45.

Figure 9:
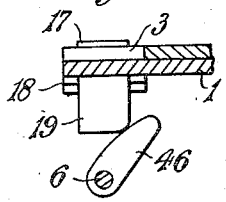
Figure 9 is a part section on an enlarged scale on the line E—E of Figure 6.
Figure 10:
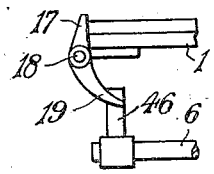
Figure 10 is a side view thereof.

The levers 17, 19 are also operated to release the edge portions of the glass by the rotation of the rod 6 which operates the laths 5 as shown in Figures 9 and 10. An arm 46 is attached to each rod 6, and, when turned (counterclockwise in Figure 9) to move the laths 5 outwards, moves the arm 19 of the levers 17, 19 (counterclockwise in Figure 10).

Similar constructions to those shown in Figures 4 and 5 and 6 and 7 may be employed in apparatus having two or four tables instead of three, the number of tables depending on the time required for cooling the glass and on the number of sheet-drawing apparatus supplying glass to the cutting tables.

Having described our invention, we declare that what we claim and desire to secure by Letters Patent is:—

1. Apparatus for cutting and trimming the edges of flat glass comprising in combination at least one table, a pivotal mounting permitting the table to occupy either a nearly horizontal position or a nearly vertical position, a fixed stop for retaining on the table the main portion of the glass and stops for retaining the cut off edge portions, movable to release the said portions when the table reaches its nearly vertical position.

2. Apparatus for cutting and trimming the edges of flat glass comprising in combination at least one table, a pivotal mounting permitting the table to occupy either a nearly horizontal position or a nearly vertical position, means for retaining on the table the main portion of the glass when the table is in its nearly vertical position, members adapted to retain the cut-off edge portions on the table during the first part of the movement of the table from the said nearly horizontal position to the nearly vertical position and means operated by the continued movement of the table to withdraw the said members and permit said edge portions to slide off the table.

3. Apparatus for cutting and trimming the edges of flat glass comprising in combination at least one table, a pivotal mounting permitting the table to occupy either a nearly horizontal position or a nearly vertical position, means for retaining on the table the main portion of the glass but not the cut-off edge portions, when the table is in the nearly vertical position, guides on the table for scoring the glass for edge trimming and means for removing the guides from the surface of the table when in its nearly vertical position and replacing them in predetermined operative position when the table is in its nearly horizontal position.

4. Apparatus for cutting and trimming the edges of flat glass comprising in combination at least one table, a pivotal mounting permitting the table to occupy either a nearly horizontal position or a nearly vertical position, means for retaining on the table the main portion of the glass but not the cut-off edge portions, when the table is in the nearly vertical position, guides for scoring the glass for edge trimming pivotally mounted on the table, counterweights normally retaining the guides in operative position and means operated by the movement of a table into its nearly vertical position to turn the guides away from the surface of the table.

5. Apparatus for cutting and trimming the edges of flat glass comprising in combination at least one table, a pivotal mounting permitting the table to occupy either a nearly horizontal position or a nearly vertical position, means for retaining on the table the main portion of the glass but not the cut-off edge portions, when the table is in the nearly vertical position, a plurality of channels in the table and means located in each channel adapted to raise the glass from the table.

6. A combination according to claim 3, characterized by the end portions of the table, from the lines of score for edge trimming, being depressed below the surface of the table.

7. Apparatus for cutting and trimming the edges of flat glass comprising a plurality of tables, a frame on which each table of the plurality is pivoted to permit the table to occupy a nearly horizontal position or a nearly vertical position, and a support on which the frame is adapted to rotate whereby each table in turn can be brought from a position for cooling the glass into a position for cutting it.

JOSEPH GASKELL.
JAMES BONAR WATT.